US011431790B2

(12) United States Patent
Prathaban et al.

(10) Patent No.: US 11,431,790 B2
(45) Date of Patent: *Aug. 30, 2022

(54) SYSTEM AND METHOD FOR GLOBAL LOAD BALANCING OF REQUESTS FOR CONTENT

(71) Applicant: R2 SOLUTIONS LLC, Frisco, TX (US)

(72) Inventors: Selvaraj Rameshwara Prathaban, Coimbastore (IN); Dorai Ashok S.A., Tamil Nadu (IN); Mahadevaswamy G. Kakoor, Bangalore (IN); Bhargavaram B. Gade, Irving, TX (US); Matthew Nicholas Petach, San Jose, CA (US)

(73) Assignee: R2 Solutions, LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/117,351

(22) Filed: Dec. 10, 2020

(65) Prior Publication Data

US 2021/0092183 A1 Mar. 25, 2021

Related U.S. Application Data

(63) Continuation of application No. 15/633,411, filed on Jun. 26, 2017, now Pat. No. 10,897,495, which is a
(Continued)

(30) Foreign Application Priority Data

Aug. 1, 2007 (IN) .......................... 1693/CHE/2007

(51) Int. Cl.
*H04L 29/08* (2006.01)
*H04L 67/1014* (2022.01)
(Continued)

(52) U.S. Cl.
CPC ........ *H04L 67/1014* (2013.01); *G06F 16/958* (2019.01); *G06F 40/211* (2020.01);
(Continued)

(58) Field of Classification Search
CPC ............. H04L 67/1014; H04L 67/1002; H04L 67/306; G06F 16/958; G06F 40/211;
(Continued)

(56) References Cited

U.S. PATENT DOCUMENTS

| 6,542,964 | B1 * | 4/2003 | Scharber | ................. | H04L 29/06 |
| | | | | | 711/122 |
| 6,981,029 | B1 * | 12/2005 | Menditto | .......... | H04L 29/12113 |
| | | | | | 709/217 |
| 7,162,526 | B2 * | 1/2007 | Dutta | ................. | H04L 67/2861 |
| | | | | | 709/229 |
| 7,904,409 | B2 * | 3/2011 | Prathaban | .............. | G06N 5/046 |
| | | | | | 709/203 |

(Continued)

*Primary Examiner* — Michael Won
(74) *Attorney, Agent, or Firm* — Noblitt & Newson, PLLC (57) ABSTRACT

The present description is directed towards systems and methods for directing a user request for content over a network to a given content server on the basis of one or more rules. Methods and systems implemented in accordance with the present description comprise receiving a request for content form a user, the request for content including a profile of the user identifying one or more characteristics associated with the user. One or more rules are retrieved for identifying a content server to which a request for content is to be delivered, the one or more rules including at least one of business rules, network rules, and user profile rules. The one or more retrieved rules are applied to the request for content to identify a content server to which the request for content is to be delivered and the request for content is delivered to the identified content server.

20 Claims, 3 Drawing Sheets

Related U.S. Application Data continuation of application No. 14/607,889, filed on Jan. 28, 2015, now Pat. No. 9,692,816, which is a continuation of application No. 13/014,978, filed on Jan. 27, 2011, now Pat. No. 8,972,326, which is a continuation of application No. 11/926,410, filed on Oct. 29, 2007, now Pat. No. 7,904,409.

(51) Int. Cl.
| | |
|---|---|
| *G06N 3/08* | (2006.01) |
| *G06N 20/00* | (2019.01) |
| *G06F 16/958* | (2019.01) |
| *G06F 40/211* | (2020.01) |
| *G06Q 30/02* | (2012.01) |
| *G06N 5/04* | (2006.01) |
| *H04L 67/1001* | (2022.01) |
| *H04L 67/306* | (2022.01) |

(52) U.S. Cl.
CPC ............... *G06N 3/08* (2013.01); *G06N 5/046* (2013.01); *G06N 20/00* (2019.01); *G06Q 30/02* (2013.01); *H04L 67/1002* (2013.01); *H04L 67/306* (2013.01); *Y10S 706/909* (2013.01); *Y10S 706/917* (2013.01); *Y10S 706/925* (2013.01)

(58) Field of Classification Search
CPC .......... G06N 3/08; G06N 5/046; G06N 20/00; G06Q 30/02; Y10S 706/909; Y10S 706/917; Y10S 706/925
See application file for complete search history.

(56) References Cited

U.S. PATENT DOCUMENTS

| | | | |
|---|---|---|---|
| 8,972,326 B2* | 3/2015 | Prathaban | H04L 67/306 706/917 |
| 9,692,816 B2* | 6/2017 | Prathaban | G06N 20/00 |
| 10,897,495 B2* | 1/2021 | Prathaban | G06N 3/08 |
| 2002/0010798 A1* | 1/2002 | Ben-Shaul | H04L 67/1021 709/247 |
| 2002/0083179 A1* | 6/2002 | Shaw | G06F 16/9574 709/227 |
| 2002/0091745 A1* | 7/2002 | Ramamurthy | H04L 67/306 718/100 |
| 2003/0005134 A1* | 1/2003 | Martin | H04L 29/06 709/229 |
| 2007/0033531 A1* | 2/2007 | Marsh | G06Q 30/02 715/738 |
| 2007/0061242 A1* | 3/2007 | Ramer | G06Q 30/02 705/37 |
| 2007/0061245 A1* | 3/2007 | Ramer | G06Q 30/02 705/37 |
| 2007/0250560 A1* | 10/2007 | Wein | H04L 67/1008 709/201 |
| 2007/0264968 A1* | 11/2007 | Frank | G06Q 30/02 455/404.2 |
| 2008/0262901 A1* | 10/2008 | Banga | G06Q 30/0205 705/14.53 |
| 2008/0263180 A1* | 10/2008 | Hurst | H04L 67/1019 709/219 |
| 2009/0125321 A1* | 5/2009 | Charlebois | H04W 4/18 705/346 |
| 2010/0064007 A1* | 3/2010 | Randall | G06Q 30/02 709/204 |
| 2013/0246581 A1* | 9/2013 | Crawford, Jr. | G06Q 30/02 709/219 |

* cited by examiner

SYSTEM AND METHOD FOR GLOBAL LOAD BALANCING OF REQUESTS FOR CONTENT

PRIORITY CLAIM

This application is a continuation of and claims priority to, U.S. application Ser. No. 15/633,411, filed Jun. 26, 2017, which is a continuation of U.S. application Ser. No. 14/607,889, filed Jan. 28, 2015, and issued as U.S. Pat. No. 9,692,816, which is a continuation of U.S. application Ser. No. 13/014,978, filed Jan. 27, 2011, and issued as U.S. Pat. No. 8,972,326, which is a continuation of U.S. application Ser. No. 11/926,410, filed Oct. 29, 2007, and issued as U.S. Pat. No. 7,904,409, which claims the priority benefit of Indian Application Ser. No. 1693/CHE/2007, entitled "SYSTEM AND METHOD FOR GLOBAL LOAD BALANCING OF REQUESTS FOR CONTENT," filed on Aug. 1, 2007, all of which are hereby incorporated by reference in their entirety.

COPYRIGHT NOTICE

A portion of the disclosure of this patent document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This invention relates generally to network load balancing. More specifically, the embodiments of the invention are directed towards systems and methods for redirecting user requests for content based upon network data and one or more rules.

BACKGROUND

The Internet provides access to an ever increasing quantity of content items, including, but not limited to, websites, documents, audio content and video content. Client devices, communicatively coupled to the Internet are able to access various content items, such as website pages, through use of a browser installed on a user's client device, which allows the user to specify a uniform resource locator ("URL") of a given content item a user wishes to access.

Content items that users may access via the Internet are typically maintained on one or more content servers. A given user's request for a particular content item may be delivered to one or more servers maintaining the requested content item. The requested content item may thereafter be delivered to the user with which the request originated.

Many users of client devices who access the Internet often request hundreds or thousands of content items during a given time period, such as within a single day. Accordingly, content servers to which requests for content are delivered often receive numerous requests for content. Additionally, a given content server may receive a greater number of requests than one or more other content servers. As the number of users connected to the Internet increases, certain content servers receive a greater proportion of requests for content.

Current techniques for distributing requests for content to one or more content servers are limited to utilizing network level parameters or rules, such as the Internet Protocol ("IP") address of a given user with which a request originated. Simply utilizing network level parameters, however, may not result in the efficient distribution of requests for content. For example, while the use of IP addresses may provide an indication of a geographic location associated with a particular user with which a request generated, delivery of requests based upon geographic location may result in the uneven distribution of requests for content in heavily populated areas.

Accordingly, there exists a need to distribute requests for content in an efficient and practical manner utilizing a plurality of rules. In order to overcome shortcomings with existing techniques for distributing requests for content to one or more content servers based upon network parameters, embodiments of the present invention provide systems and methods for distributing requests for content on the basis of various combinations of one or more business rules, network parameters, and user profile characteristics.

SUMMARY

The present invention is directed towards systems and methods for network load balancing using at least one of business rules, network rules, and user profile rules to determine a content server to which to deliver a content request from a given user. The method according to one embodiment of the present invention comprises receiving a request for content from a user. The request for content includes a user profile that contains or is otherwise associated with one or more characteristics of the given user. One or more rules are retrieved to identify a content server to which to deliver the request for content. The one or more rules include at least one of business rules, network rules, and user profile rules. The rules are applied to the request for content to identify a content server to which to deliver the request for content. The request is then delivered to the identified content server.

Information that may be included in the user profile includes demographic information, user connection speed, user membership status with respect to one or more subscription services, and user defined characteristics.

The one or more business rules may include rules for determining a content server to deliver the request for content based on the membership status of the user with respect to one or more subscription services. Also the business rules may determine a content server to deliver the request for content based on quality of service guarantees to which the user is entitled. The network rules may include one or more rules for determining a content server to which to transmit a request on the basis of the network traffic, geographic information associated with an IP address of the user, etc.

The present invention is further directed towards a system for network load balancing using at least one of business rules, network rules, and user profile rules to determine a content server to which to deliver a user's content request. A rules engine is operative to store one or more rules to identify a content server. The rules may be at least one of business, network, and user profile rules. A site redirection server receives a request for content from a user. The content request includes a profile of the user including one or more characteristics associated with the user. The site redirection server retrieves the one or more rules stored in the rules engine and applies the rules to the request for content. Then the site redirection server delivers the request for content to the identified content server.

The user profile may include user demographic information, user connection speed, user membership status with respect to one or more subscription services, and user defined characteristics.

The site redirection server retrieves and applies business rules for determining a content server to deliver the request for content based on the user's membership status with respect to one or more subscription services. In addition, the site redirection server may retrieve and apply business rules for determining a content server to deliver the request for content on the basis of one or more quality of service guarantees.

The site redirection server may also retrieve and apply network rules that identify a content server to deliver the request for content based upon network traffic, geographic information associated with an IP address of the user, etc.

BRIEF DESCRIPTION OF THE DRAWINGS

The invention is illustrated in the figures of the accompanying drawings which are meant to be exemplary and not limiting, in which like references are intended to refer to like or corresponding parts throughout, and in which.

DETAILED DESCRIPTION

In the following description of the embodiments of the invention, reference is made to the accompanying drawings that form a part hereof, and in which is shown by way of illustration of a specific embodiment in which the invention may be practiced. It is to be understood that other embodiments may be utilized and structural changes may be made without departing from the scope of the present invention.

Figure 1:
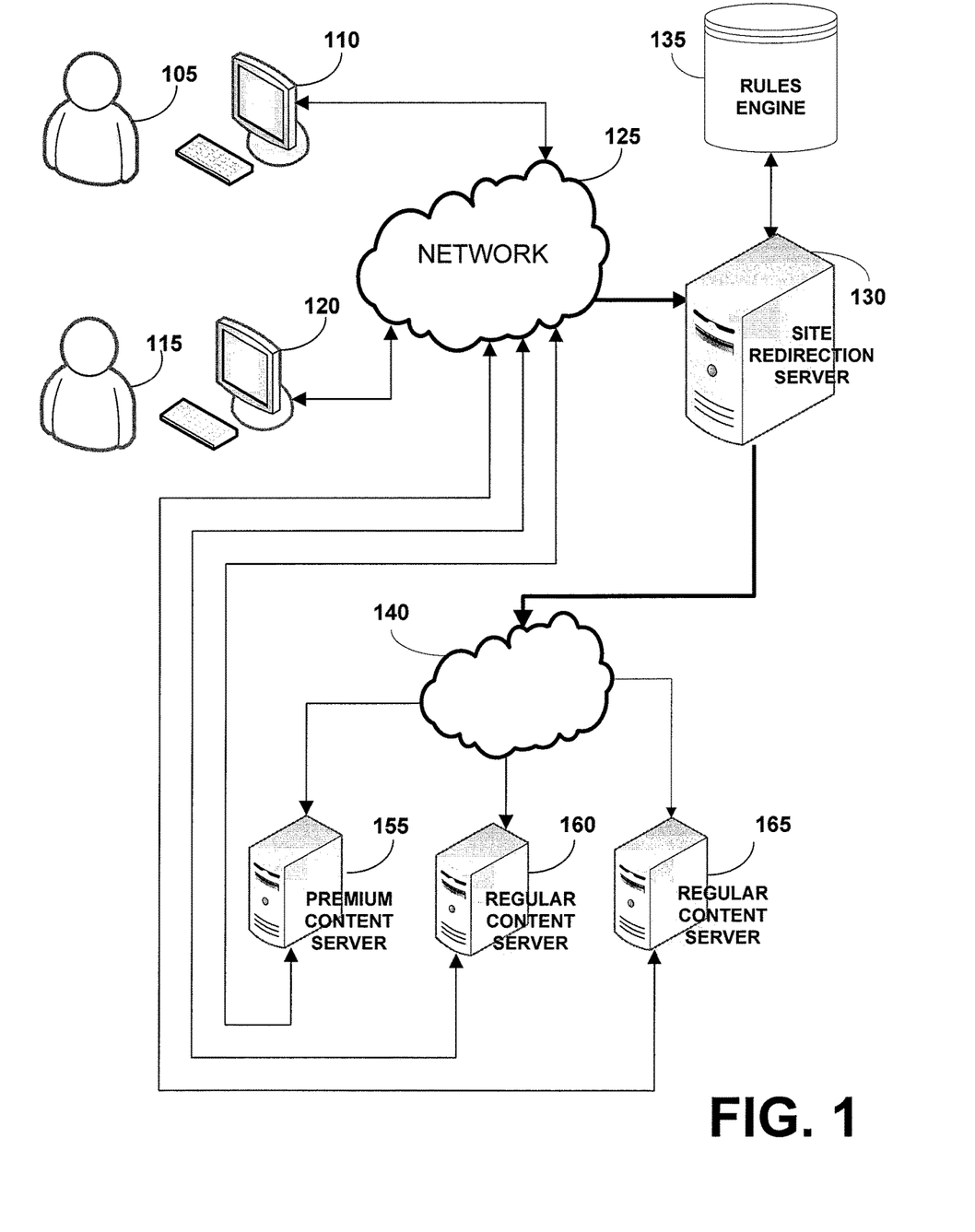
FIG. 1 is a block diagram illustrating one embodiment of a system for directing one or more user requests for content to one or more content servers on the basis of one or more rules, according to one embodiment of the present invention.

FIG. 1 presents a block diagram illustrating one embodiment of a system for directing user requests for content to one or more content servers on the basis of one or more rules. According to the embodiment that FIG. 1 illustrates, client devices 110 and 120 are communicatively coupled to a network 125, which may include a connection to one or more local and wide area networks, such as the Internet. According to one embodiment of the invention, a given client device 110 and 120 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminal mobile handsets, PDAs, etc.

A user 105 and 115 of a client device 110 and 120 may generate a request for content, including, but not limited to, one or more web pages, documents, and items of video or audio content. A given request generated by a user 105 and 115 of a client device 110 and 120 may be delivered via the network to a site redirection server 130. According to one embodiment of the present invention, a site redirection server 130 comprises a server operative to receive one or more requests for content items from one or more users 105, 115 of client devices 110, 120.

A given user may issue a request for content that includes information associated with a given user 105 and 115, including, but not limited to, a user profile, as well as information associated with a given client device 110 and 120. For example, a given request for content received from a user 105 and 115 of a client device 110 and 120 may include information such as an IP address for the client device 110 and 120, characteristics of a graphic card installed upon the client device 110 and 120, the network connection speed associated with the client device 110 and 120, etc. Similarly, a given request for content may be delivered in conjunction with a user profile identifying one or more characteristics associated with the user 105 and 115 with which the request originated. According to alternative embodiments, a user profile database or server (not illustrated) connected to the network or on the site redirection server 135 is operative to store one or more user profiles. Alternatively, or in conjunction with the foregoing, a user profile may be stored on the client device 110 and 120 associated with a given user 105 and 115.

Further according to the embodiment that FIG. 1 illustrates, the site redirection server 130 may utilize one or more rules, maintained in a rules engine 135, to determine a content server to which to deliver a request for content from a given user 105 and 115. The rules engine 135 may be implemented as a database, file system, or any other type of storage structure capable of providing for the retrieval and storage of one or more rules that may be used to determine a content server to which to deliver a request for content from a given user.

According to one embodiment of the present invention, the rules engine maintains one or more business rules indicating where to direct a given request for content on the basis of one or more characteristics maintained in a user profile associated with the user 105 and 115 from which a given request originated. For example, a given user profile is accessed in response to a given request for content and may indicate that the user from which the request originated is a premium member of a particular service or is entitled to one or more quality of service guarantees, such as audio content at a particular bit rate, image or video content at a particular resolution, or streaming content at a particular download speed. The business rules that the rules engine 135 maintains may indicate one or more particular content servers 155, 160, and 165 to which to deliver a user request for content on the basis of the one or more characteristics that the user profile maintains.

Alternatively, or in conjunction with the foregoing, the business rules that the rules engine 135 maintains may indicate one or more particular servers to which to deliver a request for content on the basis of the content requested by a particular user 105 and 115. For example, a given user 105 and 115 of a client device 110 and 120 may request a particular content item, such as an item of video or audio content. The rules that the rules engine 135 maintains may indicate that the requesting user requires delivery of the content item according to one or more characteristics, including, but not limited to, a particular speed, a resolution exceeding a predetermined threshold, or a particular level of quality. The rules may further indicate the one or more content servers 155, 160, and 165 that are capable of providing the content that the user requests according to the one or more owner specified characteristics.

Alternatively, or in conjunction with the foregoing, the rules engine maintains one or more network rules or parameters indicating a given content server 155, 160, and 165 to which to deliver a given request for content on the basis of one or more network characteristics. For example, a given request for content received from a user 105 and 115 of a client device 110 and 120 may be associated with a particular Internet Protocol ("IP") address. The IP address associated with a given client device 110 and 120 may indicate the geographic location of the client device 110 and 120 with which the request originated. The network rules maintained in the rules engine 135 may indicate a particular content server to which to deliver a request on the basis of the geographic location of a given client device 110 and 120, as indicated by the IP address of the client device 110 and 120.

Alternatively, or in conjunction with the foregoing, the network rules that the rules engine 135 maintains may indicate a content server to which to deliver a given request for content received from a user 105 and 115 of a client device 110 and 120 on the basis of network traffic or the time at which a given request for content is received. For example, the rules that the rules engine 135 maintains may identify a threshold of requests for content items that may be delivered to any given content server 155, 160, and 165 during a given time period. Accordingly, if the number of requests delivered to one or more content servers 155, 160, and 165 exceeds the threshold, the rules may indicate one or more alternative content servers 155, 160, and 165 to which to deliver a request. Similarly, the rules maintained in the rules engine 135 may identify one or more servers 155, 160, and 165 to which to deliver requests for content received at one or more time periods. For example, the rules that the rules engine 135 maintains may indicate that requests for content items received during the hours of 11:00 AM through 4:00 PM are to be delivered to one or more content servers 155, 160, and 165, whereas requests for content received during the hours of 4:01 PM through 10:59 AM are to be delivered to one or more alternate content servers 155, 160, and 165.

Further according to the embodiment that FIG. 1 illustrates, the site redirection server 130 retrieves the one or more rules that the rules engine 135 maintains, and based upon the foregoing network rules, business rules, and information maintained in a user profile, identifies a content server 155, 160, and 165 to which to deliver the request for content. The site redirection server 135 thereafter delivers the request for content to the identified content server 155, 160, and 165. The site redirection server 135 is coupled to a network 140 to deliver the requests to the content server 155, 160, 165. This network may be one or more local and wide area networks, such as the Internet, or may be a dedicated internal network. The site redirection server 135 may deliver the request to content server 155, 160, 165 through the best possible path through the network 140.

The site redirection server 135 may be operative to update or annotate the profile associated with a given user 105 and 115 with which a request for content originated to indicate the content server 155, 160, and 165 to which the user's request for content is delivered. For example, as previously described, the site redirection server 135 may identify a content server 155, 160, and 165 to which a given request for content is to be delivered on the basis of one or more business rules, network rules, and characteristics maintained in a profile associated with a given user 105 and 115. Upon identifying the server to which the user's request for content is to be delivered based upon the one or more rules, the site redirection server may annotate the profile for the user with information identifying the particular content server 155, 160, and 165 to which the user's request is delivered. The site redirection server 135 may use the information maintained in the user profile indicating content servers 155, 160, and 165 to which requests received from the user were delivered in order to identify a content server 155, 160, and 165 to which to deliver subsequent requests received from the user.

The content server 155, 160, and 165 to which a given request for content is delivered by the site redirection server delivers the requested content to the client device 110 and 120 from which the request originated. As previously described, the content that a particular user 105 and 115 of a client device 110 and 120 requests may include, but is not limited to, a website page, audio or video content, a document, etc. The content server may deliver the requested content to the user 105 and 115 from which the request originated via the network 125. The content server may comprise a web server that, after receiving a given request for content, communicates the requested content to the user 105 and 115 with which the request originated through the use of one or more network protocols, including, but not limited to, TCP/IP.

Figure 2:
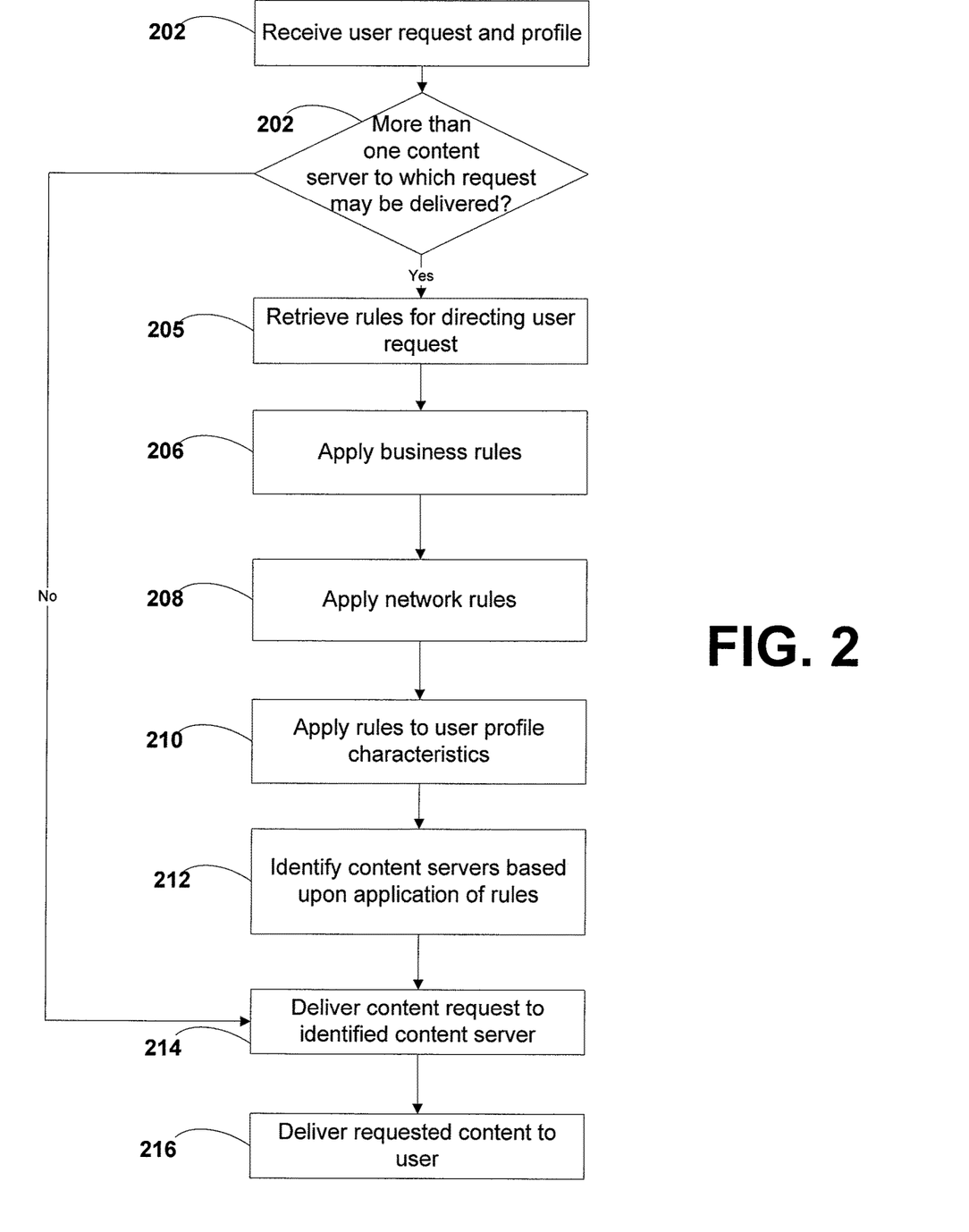
FIG. 2 is a flow diagram illustrating one embodiment of a method for directing a user request to a given content server, according to one embodiment of the present invention.

FIG. 2 is a flow diagram illustrating one embodiment of a method for directing a user request for content to a given content server on the basis of one or more rules. According to the embodiment illustrated in FIG. 2. A given user request for a given content item is received and a profile associated with the user from which the request originated is accessed, step 202. The profile associated with a given user may contain various information including, but not limited, one or more premium services to which the user is subscribed, one or more preferences of the user associated with the way in which the user receives requested content, and one or more user characteristics. For example, a given user profile may indicate that the user is a subscriber to a premium service that provides the user access to audio and video content at a given bit rate or a particular resolution.

Alternatively, or in conjunction with the foregoing, a given user profile may indicate that the user's connection to a given network, such as the Internet, is limited to a particular speed, thus indicating that the user wishes to receive content via the network at or below the user's connection speed. Similarly, a user profile may indicate the geographic location of the user, as well as one or more characteristics associated with the user, such as the user's age, sex, etc. Those of skill in the art recognize that a given user profile may comprise a number of items of information regarding the user, which may include information regarding one or more devices of the user.

A check may be performed to determine whether the request for content received from the user may be delivered to more than one content server, step 204. If the request for content may only be delivered to a single content server, the request is delivered to that content server and the requested content is returned to the user with which the request originated, step 214. If the request for content may be delivered to more than a single content server, one or more rules for directing the user request for content to a given content server are retrieved, step 205. The one or more rules may comprise one or more rules including, but not limited to, business rules, network rules, and one or more rules for directing a request to a content server on the basis of information maintained in a user profile.

According to the embodiment of the method that FIG. 2 illustrates, one or more retrieved business rules are utilized to process the content item request, step 206. According to one embodiment of the present invention, the one or more business rules comprise rules for directing a request for content to a content server on the basis of information maintained in a user profile that indicates whether a given user is a premium user or subscriber of a given service. For example, the user profile associated with the user from which the request originated (e.g., step 202) may indicate that the user is a subscriber of a given service, entitling the user to content of a given quality. The business rules may indicate or be used to determine a content server maintaining content that meets the level of quality to which the user is entitled.

Alternatively, or in conjunction with the foregoing, the user profile associated with the user from which the request originated may indicate that the user is entitled to one or more quality of service guarantees. For example, the user profile may indicate that a user is entitled to receive content via a network at a minimum download speed. The business rules may indicate or be used to determine a content server to which the user's request is to be delivered to ensure that the user receives content in accordance with the quality of service to which the user is entitled.

One or more network rules may be applied to the request received from the user, step 208. The one or more network rules may comprise rules indicating a content server to which a request for content is to be delivered based upon one or more network characteristics. For example, the network rules may indicate that requests for content received during a given time period, such as a certain day, hour, month, etc., are to be delivered to one or more particular content servers. Similarly, the network rules may indicate a maximum threshold of requests that may be delivered to a given content server, further identifying one or more content servers to which requests are to be delivered if the maximum threshold of requests delivered to the one or more content servers has been exceeded. Alternatively, or in conjunction with the foregoing, the network rules may identify one or more content servers to which a given user request for content is to be delivered based upon information associated with the IP address of the user with which a request for content originated.

One or more rules may be applied to the one or more characteristics maintained in the user profile associated with the user from which the request originated, step 210. The one or more rules applied to the one or more characteristics maintained in a user profile may include, but are not limited to, rules identifying one or more content servers to which a request is to be delivered based upon the geographic location of the user or the demographic information regarding the user. Alternatively, or in conjunction with the foregoing, the one or more rules may identify one or more content servers to which a request is to be delivered on the basis of one or more preferences or settings in a user profile, such as the monitor resolution of a given user, the processing speed of a given user's graphics card, or whether the client device utilized by the user has audio capabilities.

The one or more content servers to which the request for content by the user may be delivered is identified based upon application of the business rules, network rules, and rules applied to the profile associated with the user with which the request originated, step 212. The user's request for content is thereafter delivered to a given identified content server, step 214. The content requested is thereafter returned from the given identified content server to the user from which the requested originated, step 216.

Figure 3:
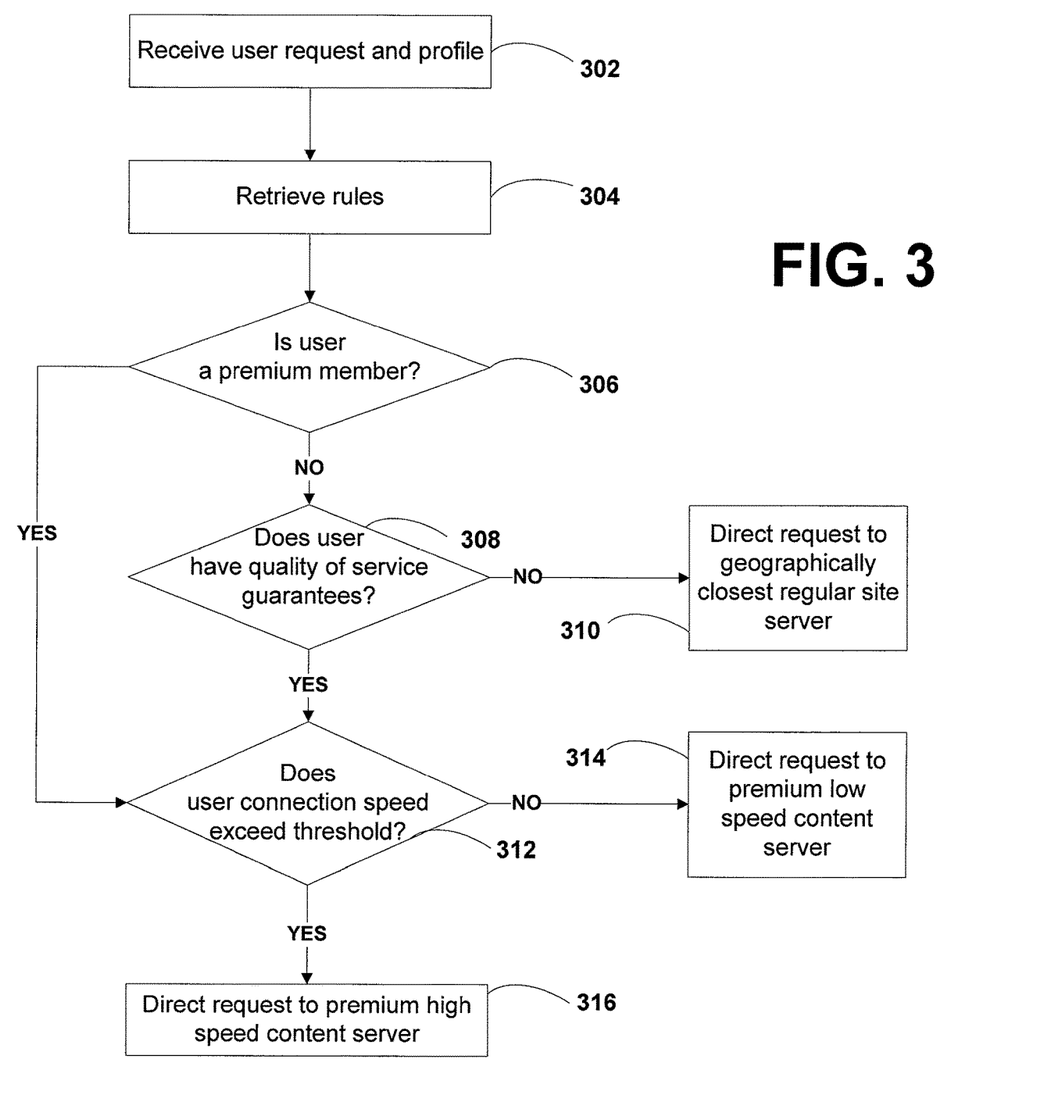
FIG. 3 is a flow diagram illustrating one embodiment of a method for directing a user request to a given content server, according to one embodiment of the present invention.

FIG. 3 presents a flow diagram illustrating one embodiment of a method for directing a user request for content to a given content server on the basis of one or more rules. As previously described, a user request and a user profile are received, step 302. A request for content received from a given user may be generated through use of a computer comprising a programmable processor to execute instructions for connecting to a network, such as the Internet, in addition executing program code contained on computer readable media to perform the methods described herein. The request received from a given user may be generated by a client application installed on the computer, such as a web browser that a user directs to a particular web site page.

As previously described, the profile associated with a given user may contain various information including demographic information, premium services the user has access to, and preferences about how the user wishes to receive content. According to the embodiment of the method that FIG. 3 illustrates, one or more rules for directing the user request for content to a given content server are retrieved, step 304. The one or more rules retrieved may comprise one or more rules including, but not limited to, business rules, network rules, and one or more rules for directing a request to a content server on the basis of information maintained in a user profile.

According to the embodiment illustrated in FIG. 3, applying the one or more business rules to the information in the user profile includes determining if the user is a premium user, step 306. For example, a given user profile may indicate that the user is a subscriber to a premium service that may provide the user exclusive content on content servers not available to regular users.

If the user is not a premium user, rules are applied to the request and the user profile to determine whether the user is entitled to one or more quality of service guarantees, step 308. Certain non-premium users may be targeted by a content provider based on their profile characteristics, such as age, gender, interests, and related characteristics. For example users with profiles indicating a preference for soccer may be able to receive exclusive content or higher quality content during the duration of the World Cup. Such content may be any audio, video, or other content that provides updates of the World Cup event.

If the user is not entitled to one or more quality of service guarantees, the user's request may be directed to the geographically closest regular site server, step 310. The user's IP address or the user's profile may indicate the user's geographic location, which can then be used to direct the request to the closest regular site server. If the user is entitled to one or more quality of service guarantees, or if the user is a premium member, network rules and/or business rules are applied to the user's profile to determine whether the user's connection speed exceeds a given connection speed threshold, step 312. For example, a given user profile may indicate that the user's connection to a given network, such as the Internet, is limited to a particular speed, such as dial-up or 56K. Alternatively, the user may have a broadband connection but the user profile indicates content should be received in such a way that uses only a portion of the user's available bandwidth.

The user's profile may indicate only certain types of content are to be received from a high speed premium server and that other types of content are to be received from a low speed content server. For example, certain types of content may utilize large amounts of bandwidth and computing power. Accordingly, a user's profile may indicate some media content should be received from a low speed content server in order to limit the resources of the network connection and user's computer. In addition, the user may further designate other content that is less taxing on bandwidth and computer resources, such as audio content, to be downloaded from a high speed content server.

Alternatively, or in conjunction with the foregoing, the user's connection speed may be determined from the network properties of the request itself. For example internet providers' IP address numbers fall within certain ranges. In one embodiment the site redirection server may analyze the IP address of the content request and determine what range the IP address number falls within. The user's connection speed can then be discovered. In another embodiment, the site redirection server receiving the request may implement a quick speed test with the user's computer. This may include sending a small data request to the user's computer and determining the time it takes to receive the requested data. This information can be used to determine the speed of the user's connection.

If the user's profile indicates a preference for a low speed connection for the particular request for content, or if the connection speed does not meet the connection speed threshold, the request is directed to a premium low speed content server, step 314. If the user's connection speed meets or exceeds the connection speed threshold and the user's profile allows the user to receive the requested content from a high speed content server, then the request may be directed to a premium high speed server, step 316.

There may be multiple premium high speed and low speed servers to which to the user's content request may be delivered. According to one embodiment of the present invention, the user's request may be directed to the geographically closest high speed or low speed premium content server. According to another embodiment of the present invention, the request may be delivered to the server with the least amount of network traffic.

FIGS. 1 through 3 are conceptual illustrations allowing for an explanation of the present invention. It should be understood that various aspects of the embodiments of the present invention could be implemented in hardware, firmware, software, or combinations. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

The invention claimed is:

1. A method for directing a user request for content over a network to a given content server on the basis of one or more rules, the method comprising:
   receiving a request for content from a user, the request for content including a user profile identifying one or more characteristics associated with the user;
   retrieving one or more rules for identifying a content server to which a request for content is to be delivered, the one or more rules including at least one of business rules, network rules, and user profile rules, wherein retrieving the network rules comprises retrieving one or more rules for determining a content server to which the request for content is to be delivered based upon geographic information associated with an Internet Protocol address of the user;

applying the one or more retrieved rules to the request for content to identify a content server to which the request for content is to be delivered; and delivering the request for content to the identified content server.

2. The method of claim 1, wherein the one or more characteristics in the user profile includes at least one of user connection speed, user membership status with respect to one or more subscription services, or user defined characteristics.

3. The method of claim 1, wherein the one or more characteristics in the user profile indicates that the user is a subscriber of a given service and entitled to content of a given quality.

4. The method of claim 1, wherein retrieving one or more business rules comprises retrieving one or more rules for determining a content server to which the request for content is to be delivered based upon one or more quality of service guarantees to which the user is entitled.

5. The method of claim 4, wherein the one or more quality of service guarantees include an agreement to provide audio content at a particular bit rate, image or video content at a particular resolution, or streaming content at a particular download speed.

6. The method of claim 4, wherein the retrieved business rules route the request for content to the determined server in order to ensure that the user receives content in accordance with a quality of service to which the user is entitled.

7. The method of claim 1, wherein the request for content is submitted by the user from a mobile device.

8. A non-transitory computer readable media comprising instructions stored thereon for execution by a programmable processor to perform a method for directing a user request for content over a network to a given content server on the basis of one or more rules, the computer readable media comprising:

instructions for receiving a request for content from a user, the request for content including a user profile identifying one or more characteristics associated with the user;

instructions for retrieving one or more rules for identifying a content server to which a request for content is to be delivered, the one or more rules including at least one of business rules, network rules, and user profile rules, wherein retrieving the network rules comprises retrieving one or more rules for determining a content server to which the request for content is to be delivered based upon geographic information associated with an Internet Protocol address of the user;

instructions for applying the one or more retrieved rules to the request for content to identify a content server to which the request for content is to be delivered; and instructions for delivering the request for content to the identified content server.

9. The non-transitory computer readable media of claim 8, further comprising instructions for retrieving one or more business rules comprises instructions for retrieving one or more rules for determining a content server to which the request for content is to be delivered based upon one or more quality of service guarantees to which the user is entitled.

10. The computer readable media of claim 9, wherein the retrieved network rules route the request for content to the determined server in order to ensure that the user receives content in accordance with a quality of service to which the user is entitled.

11. The non-transitory computer readable media of claim 8, wherein the user profile indicates that the user is entitled to content of a given quality.

12. The non-transitory computer readable media of claim 8, wherein the user profile identifies at least one of user connection speed, user membership status with respect to one or more subscription services, or user defined characteristics.

13. The computer readable media of claim 8, wherein the network rules further comprise instructions for retrieving one or more rules for determining a content server to which the request for content is to be delivered based upon network traffic.

14. A system for directing a user request for content over a network to a given content server on the basis of one or more rules, the system comprising:

a rules engine operative to store one or more rules for identifying a content server to which a request for content is to be delivered, the one or more rules including at least one of business rules, network rules, or user profile rules; and a site redirection server operative to:

receive a request for content from a user, the request for content including a user profile identifying one or more characteristics associated with the user;

retrieve the one or more rules stored in the rules engine, wherein the site redirection server is operative to retrieve and apply one or more network rules for determining a content server to which the request for content is to be delivered based upon geographic information associated with an Internet Protocol address the user;

apply the one or more retrieved rules to the request for content from the user; and deliver the request for content to the identified content server.

15. The system of claim 14, wherein the one or more characteristics in the user profile indicates that the user is a subscriber of service having a quality of service guarantee.

16. The system of claim 14, wherein the one or more characteristics in the user profile includes at least one of user connection speed, user membership status with respect to one or more subscription services, or user defined characteristics.

17. The system of claim 14, wherein the site redirection server is operative to retrieve and apply one or more business rules for determining a content server to which the request for content is to be delivered based up one or more quality of service guarantees to which the user is entitled.

18. The system of claim 17, wherein the retrieved business rules route the request for content to the determined server in order to ensure that the user receives content in accordance with a quality of service to which the user is entitled.

19. The system of claim 17, wherein the retrieved business rules further determine which content server to route the request for content to during delivery in order to maintain the level of quality to which the user is entitled.

20. The system of claim 14, wherein the network rules further comprise one or more rules for determining which content server to route the request for content is based upon network traffic.

\* \* \* \* \*